C. A. GLASS.
CULTIVATOR.
APPLICATION FILED APR. 7, 1913.
1,205,342.
Patented Nov. 21, 1916.
2 SHEETS—SHEET 1.
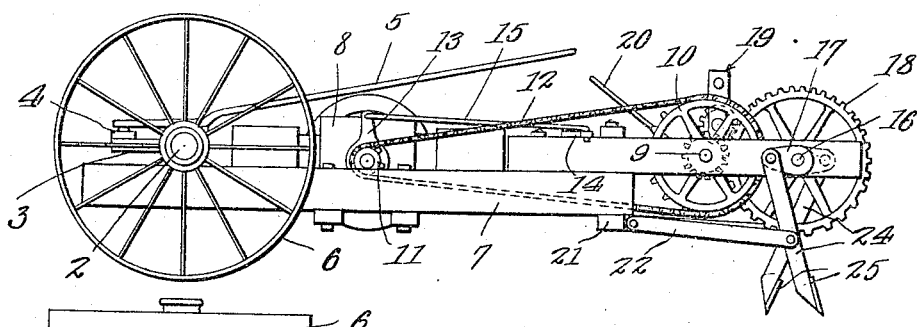
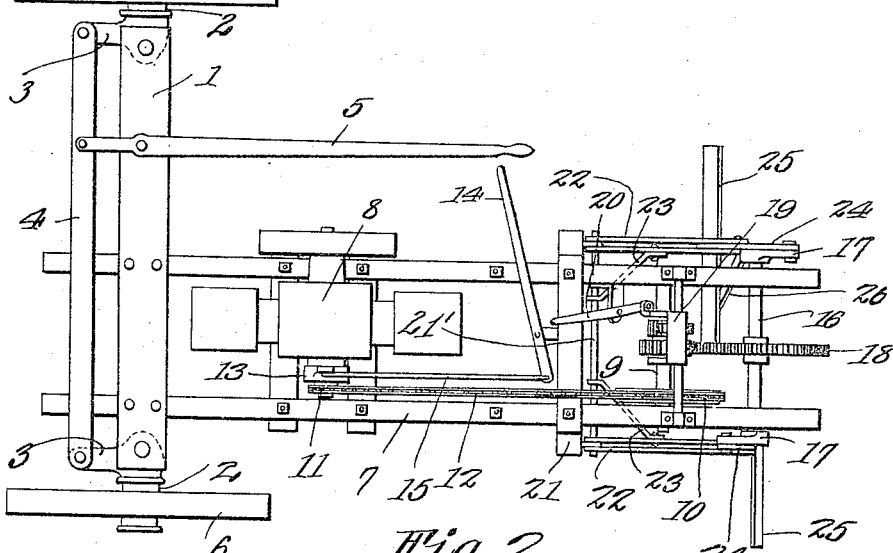
WITNESSES
E. F. Camp
M. C. Lucas
C. A. Glass.
INVENTOR
by Eugene F. Thomas
Attorney C. A. GLASS.
CULTIVATOR.
APPLICATION FILED APR. 7, 1913.
1,205,342.
Patented Nov. 21, 1916.
2 SHEETS—SHEET 2.
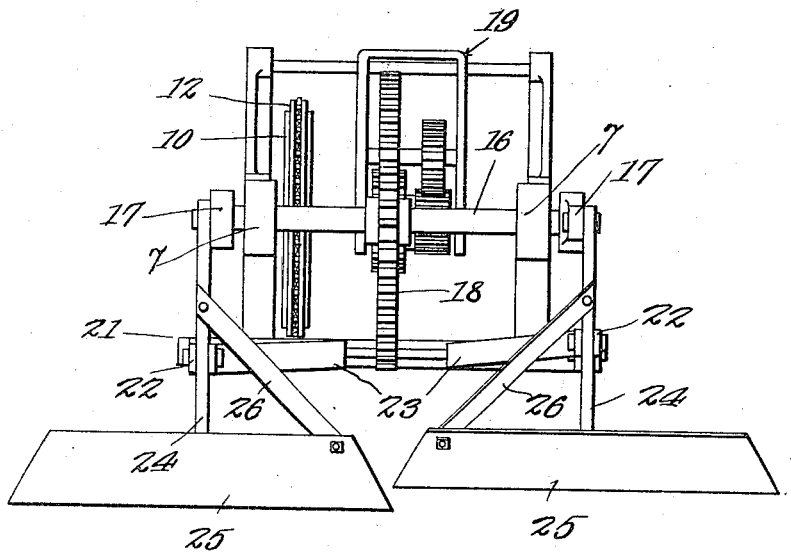
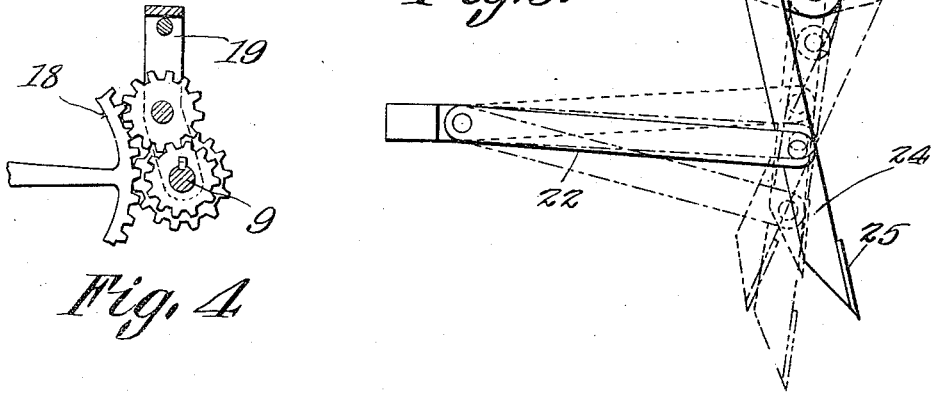
WITNESSES
E. F. Ramp
M. C. Lucas.
C. A. Glass
INVENTOR
by Eugene R. Storm
Attorney

UNITED STATES PATENT OFFICE.

CHARLES A. GLASS, OF GREENSBURG, KANSAS.

CULTIVATOR.

1,205,342.          Specification of Letters Patent.     Patented Nov. 21, 1916.

Application filed April 7, 1913. Serial No. 759,455.

*To all whom it may concern:*

Be it known that I, CHARLES A. GLASS, a citizen of the United States, residing at Greensburg, in the county of Kiowa and State of Kansas, have invented certain new and useful Improvements in Cultivators, of which the following is a specification.

This invention relates to that class of cultivators known as "mechanical diggers," "power plows," "combined soil pulverizer and cultivator," and the like, which are designed to chop up, dig, or otherwise disintegrate the soil, by means of spades, forks, shovels, blades and like devices operated by an engine or motor, as the machine is moved across the field.

An object of the invention is to provide a cultivator of the kind stated having improved means whereby the same elements or members which operate to work the soil also operate to sufficiently propel the machine forward over the field.

A further object of the invention is to provide a cultivator having improved means whereby the soil working members, actuated by cranks, may operate in such manner as to feed the machine forward continuously at a sufficient rate of movement to the unworked portion of the field.

Another object of the invention is to provide a cultivator having sufficient weight mounted on, and supported by the soil working members, as to cause said members to clutch in the soil sufficiently to propel the machine against any ordinary resistance. The frame of the machine carries the engine, and one end of the frame is supported entirely by the soil working members.

The invention also has for its object to provide wheel supporting and guiding means for the machine which will allow the soil working end free motion vertically, but which will firmly support the frame against lateral strain. The axle is rigidly connected with the frame, and the ground wheels are journaled on spindles pivoted to the axle.

A still further object of the invention is to provide means for reversing the movement of the soil working members, so that the machine may be backed into and out of corners, or other places where space is limited.

Another object of the invention is to provide a low down automatic cultivator which may be worked close up to tree and fence rows, and rows of previous work. The cultivator is built low down and may be run under overhanging limbs of trees, and on one side a soil working blade or member extends out beyond the wheel on the corresponding side.

With these objects in view, the invention consists in a novel combination and arrangement of parts to be hereinafter described and claimed, and in order that the invention may be better understood, reference is had to the accompanying drawings illustrating the preferred embodiment of the invention.

In the drawings, Figure 1 is a side elevation of the cultivator. Fig. 2 is a top plan view thereof. Fig. 3 is a rear end elevation of the same. Fig. 4 is a detailed enlarged view of a reversing gear. Fig. 5 is a side elevation showing in dotted lines the various positions assumed by the blade or soil working members of the cultivator.

Referring specifically to the drawings, the axle 1 of the cultivator carries pivoted spindles 2 at its ends. These spindles are provided with forwardly disposed arms 3 which are pivotally connected together by a bar 4. A lever 5 is fulcrumed upon the axle 1 and is pivotally connected with the intermediate portion of the bar 4. Ground or supporting wheels 6 are journaled upon the spindles 2. Therefore, it will be seen that by swinging the lever 5, the bar 4 may be moved longitudinally, and through the arms 3 the spindles 2 are turned so that the wheels 6 may be disposed in desired directions. These elements constitute the steering apparatus of the cultivator. A frame 7 is fixed at the forward end to the axle 1 and an engine 8 is mounted upon the frame 7 behind the axle. The engine 8 is preferably of the hydrocarbon or internal combustion type and may be of any conventional form or design.

A shaft 9 is journaled for rotation at the rear part of the frame 7 and a sprocket wheel 10 is fixed to the said shaft. A sprocket wheel 11 is loosely mounted upon the shaft of the engine 8 and a sprocket chain 12 is trained around the sprocket wheels 10 and 11. A clutch member 13 is arranged to coöperate with the sprocket wheel 11 whereby the said sprocket wheel may be fixed with relation to the shaft of the engine 8. A lever 14 is fulcrumed upon the frame 7 and a rod 15 operatively connects the working end of the lever 14 with the clutch member 13. Therefore, it will be seen that by manipulating the lever 14, the clutch member 13 may be moved into engagement with the sprocket wheel 11 to fix the said sprocket wheel with relation to the said engine shaft or the said clutch member may be moved out of engagement with the sprocket wheel 11, whereby the said sprocket wheel is permitted to remain loose upon the shaft of the engine 8. When the clutch member 13 is in engagement with the sprocket wheel 11 rotary movement is transmitted from the shaft of the engine 18 by the chain 12 and the sprocket wheel 10 to the shaft 9.

A shaft 16 is journaled for rotation at the rear part of the frame 1 and is provided at its ends with cranks 17. These cranks are located beyond the outer sides of the frame 7, and the crank 17 at one end of the shaft 16 is disposed in an opposite direction from the crank 17 at the other end of the said shaft. A gear wheel 18 is fixed to the shaft 16 between the sides of the frame 7. A reversing gear mechanism 19 is mounted upon the shaft 9 and is operatively connected with a lever 20. This reversing gear mechanism may be moved by using the lever 20, so that the gear wheel 18 is caused to rotate in one direction or in an opposite direction. When operated on the direct gear, the upper part of the gear wheel 18 is rotated in a rearward direction with relation to the frame 7 and the cultivator is moved in a forward direction; but when run on the reverse gear, the upper part of the gear wheel 18 is moved toward the forward part of the cultivator and the cultivator is backed or moved in a rearward direction as will be best understood from the following description.

A cross bar 21 is attached to the frame 7 between the ends thereof and behind the engine 8. Links 22 are pivoted at their forward ends to the end portions of a rod 21' carried by the cross bar 21. Each link 22 is provided at its inner side with a brace 23, and the forward ends of the braces 23 are pivotally connected with the intermediate portion of the rod 21'. Standards 24' are pivoted at their upper ends to the cranks 17 and the rear ends of the links 22 are pivoted to the standards 24 at points between the ends thereof. Blades 25 are carried at the lower ends of the standards 24. One blade 25 extends out beyond the corresponding wheel 6. This arrangement allows that this side of the cultivator may be run close up to rows of previous work and that the wheels may be run over the firmer unworked soil. This arrangement also allows that the soil may be worked close up to tree or fence rows. In the small models in which the blades do not extend out very far on each side, the wheel on this side may set in close to the frame in order to be inside the blade, and thus clear the rows before mentioned.

The wheels 6 are set far enough apart to secure proper poise against transverse strain and to have plenty of wrench and engine crank room. In the small models one of the wheels 6, preferably on the controller side of the cultivator, may be set out beyond the corresponding blade 25 as shown in Fig. 2, in order to secure the required width of tread.

The crank end of each standard or shank 24 circles around in a vertical plane. The shanks 24 being fulcrumed on one end of the connecting links 22, the blades 25 are forced to circle around in a vertical plane in a direction opposite to that of the upper or wrist pin ends of the said shanks, moving downward through the forward arc of the circle of motion, backward through the lower arc, upward through the rear arc, and forward through the upper arc of said circle of motion. It will be understood that the blades do not turn over and over, but rock back and forth as do the shanks, always presenting the edges toward the soil surface.

Inasmuch as the cranks 17 are set in opposite throws on the shaft 16, the blades 25 are moved successively at regular intervals through corresponding lower positions in similar cycles of motion. The foregoing pertains to relative motions of parts.

The rear end of the machine is mounted on and entirely supported by the soil working members 24 and 25, the weight tending to force the blades into the soil. The parts are so proportioned in relative size and weight and with regard to the average physical condition of the soil that is to be worked, that the blades are forced into the soil only to a limited extent of the range of vertical motion.

In operation, it will be understood that as the blade in the lower position is engaged in the soil surface, the rear part of the frame is supported thereon, the other blade is in the upper position, clear of the ground, and the blade in the lower position clutching the soil is being pushed back, tending to drive the cultivator forward. By the time the first blade reaches the position farthest back in its course, the other has passed to the forward position and is engaged in the soil, then the cultivator is raised on the second blade and is carried forward as the blade is pushed backward through the lower position, and at the same time the first blade is returned clear of the soil through the upper position to the initial position. Thus, the operation continues, the blades alternately supporting and carrying the weight of the rear end of the frame, and then advancing forward clear of the surface, and the cultivator thus advances step by step over the soil.

It will be understood that the use of two blades is an advantage over one, or rather blades operated by two throws of cranks is an advantage over a blade or blades operated by a single throw of crank or cranks, inasmuch as the blade or blades operated by one of the two throws may support and carry the weight while the blade or blades operated by the other throw is being returned forward through the upper position.

The manner shown of mounting the front end of the frame 7 on the guiding or controlling truck (1, 2, 3, 4, 5 and 6) allows the rear end of the frame to swing vertically, playing up and down, following up and forcing the blades into the soil and yielding back from too great resistance. This peculiar construction and mechanical arrangement secures a very even load on the power, a very desirable result when an explosive or internal-combustion motor is used. The resistance to the thrust of the blades is gaged by the amount of weight carried thereon, which weight does not vary with the varying conditions of the soil. The engine, and in fact the entire machine, some parts more and others less, are in sympathetic action with the motion of the blades, reinforcing the blades against a certain degree of soil resistance and readily yielding back from too great resistance. This feature of utilizing the weight of the motor is of great advantage, increasing the chopping effect of the blades on the soil, as over the plan of carrying the engine on a truck, traction or otherwise, entirely wheel mounted. The explosive engine preferably used, being built to stand the shock of the explosions is especially adapted to stand the jar of such machine motion. The more delicate elements of the motor equipment, such as batteries and water and oil tanks, may be mounted near the axle where the machine motion is least.

There are several ways in which the cultivator acts to disintegrate or break up the compactness of the soil. One is the chopping action thrusting the blades down into the soil, and another is the spade like prying open action of leaning the shanks 24 forward while the blades 25 are engaged in the soil. Still another way in which the cultivator acts to work the soil is the slipping of the blades in the soil, as on account of inertia the cultivator cannot accommodate itself to the rapidly varying rate of backward thrust of the blades while engaged in the soil. When the blades first come in contact with the soil, the thurst is almost directly downward, beginning and increasing the rate of backward movement until the extreme lower position is reached, then decreasing in rate of backward movement until the extreme backward position is reached when the direction of movement is again nearly vertical. These cycles of variation occurring at the rate of 50 to 100 per minute, it will be understood that on account of inertia the advancement of the cultivator will not vary accordingly, but will be an average of the propelling action of the blades. Thus, the blades are forced to work back and forth more or less in the soil.

Of course, it will be understood that the invention is not necessarily limited to the use of only two blades, but it has been found by experiment that the soil disintegrating effect is greatly increased by operating all the blades by two throws of cranks set on the shaft directly opposite each other.

The soil working members operated in two sets by opposed cranks cause the greatest chopping effect on the soil, as the rear end of the frame has the farthest possible drop from the raised position on one blade to the soil engaging position on the succeeding blade, and the blades are engaged in the soil during the greatest possible portion of the cycle of movement, thus allowing the greatest possible inclination of blades, and the greatest possible variation in rate of movement while in the soil. Therefore it will be seen that a machine of simple structure is provided which may be effectively used for cultivating the soil, chopping stalks and at the same time preparing the stalk fields for future crops.

It will be understood that operating the reverse gear 20, the direction of the soil working elements is reversed and thus the cultivator may be backed up, which feature is of great advantage in operating the cultivator.

I claim:

1. In a cultivator, a frame, an engine mounted on the frame, pivoted spindles at one end of the frame, wheels journaled on the spindles, and reciprocatory spading elements operatively connected with the engine, and forming the sole support of the other end of the frame, the entire traction or driving weight of the cultivator being on the spading elements.

2. In a cultivator, a pair of spading elements forming the sole driving means of the cultivator, cranks operatively connected to said spading elements to move the same simultaneously through opposing positions in parallel cycles of motion, and links connecting said elements with the frame of the cultivator.

3. In a cultivator, a frame, an engine mounted on the frame, cranks carried by the frame and operatively connected with the engine, a pair of standards operatively connected, respectively, with the cranks, links connecting said standards with the frame, and spading blades carried by the standards and operating to move simultaneously through opposing positions in parallel cycles of motion, said spading blades and their standards forming the sole supporting means of the outer end of the frame, the entire traction weight of the cultivator being borne thereby.

4. In a cultivator, a frame, an engine mounted on the frame, cranks carried by the frame and operatively connected with the engine, a pair of standards operatively connected, respectively, with the cranks, links connecting said standards with the frame, and spading blades carried by the standards and operating to move simultaneously through opposing positions in parallel cycles of motion, said spading blades being the sole means for propelling the cultivator.

5. In a cultivator, a frame, an engine carried by the frame, cranks carried by one end of the frame and operatively connected with the engine, standards pivoted to the frame and connected with the cranks, spading elements carried by the standards and forming the sole support of the crank end of the frame, and a wheeled truck supporting the other end of the frame in such manner as to allow the crank end of the frame to play up and down freely with the varying vertical extension of the spading elements.

6. In a cultivator, a frame, an engine mounted upon the frame, a shaft carried by the frame, standards pivotally connected with the frame and operatively connected with the engine, and spading elements carried by the standards and forming the sole support of one end of the cultivator, and said elements having uniform motion in relation to the frame and the engine.

7. In a cultivator, a frame, a shaft carried by the frame, means for rotating the shaft, means for reversing the rotation of the shaft, standards pivotally mounted on the frame and operatively connected with the shaft, and spading elements carried by the standards, and forming the sole propelling means of the cultivator.

8. A cultivator comprising a wheeled frame, an engine mounted upon the frame, spading elements carried by the rear part of the frame and forming the sole support thereof, and means for operating said elements from the engine, the parts being so arranged that the rear part of the frame may play vertically against the varying resistance to the thrust of the spading elements.

9. A cultivator comprising a frame, wheels supporting the front end of the frame, and spading elements carried at the rear part of the frame, the distance between the wheels being greater than the combined width of the spading elements to locate one of the wheels in the path of movement of one of said elements, the other wheel being located beyond the path of movement of the other one of said elements.

10. A cultivator comprising a frame, an engine mounted on the frame, and reciprocatory spading elements operatively connected with the engine and serving as a sole means for propelling the cultivator.

11. A cultivator comprising a frame, wheels supporting one end of the frame, the other end of the frame being free to swing vertically, an engine mounted on the frame, and reciprocatory spading elements operatively connected with the engine and supporting the second-mentioned end of the frame and serving as a sole means for propelling the cultivator.

12. In a motor cultivator, a driving-digger means having digger blades operated to clutch in the soil and thrust backward with sufficient force to drive the cultivator forward, and the entire traction weight of the cultivator bearing on the digger means, and said digger means being the sole driving means of the cultivator.

13. In a motor cultivator, a supporting frame, a driving-digger means having spading blades, standards carrying the blades, pivoted links connecting the standards to the supporting frame, and cranks operating the standards, the spading blades operating to clutch in the soil and thrust backward with sufficient force to drive the cultivator forward, and the entire traction weight of the cultivator bearing on the digger means, and said digger means being the sole driving means of the cultivator.

14. In a motor cultivator, a driving-digger means having digger blades operated to work the soil and serving as the sole driving means of the cultivator, and means for reversing the thrust of the digger blades.

In testimony whereof I affix my signature in presence of two witnesses.

CHARLES A. GLASS.

Witnesses:
R. JOHNSON,
MARGARET KANE.

Copies of this patent may be obtained for five cents each, by addressing the "Commissioner of Patents, Washington, D. C."